United States Patent Office 3,458,077
Patented July 29, 1969

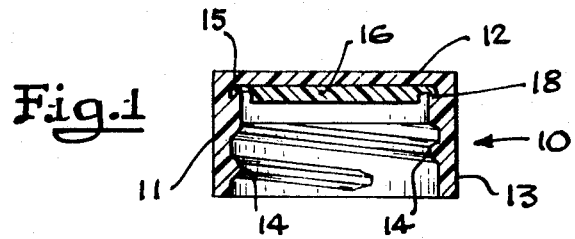
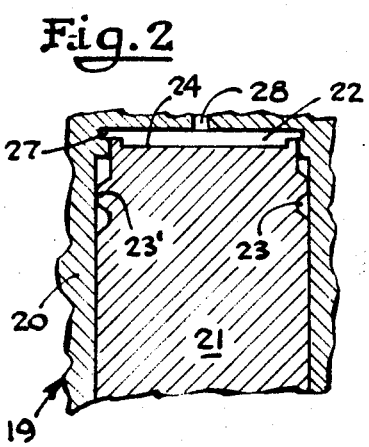
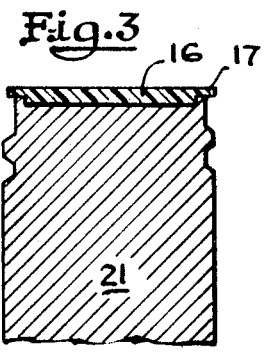
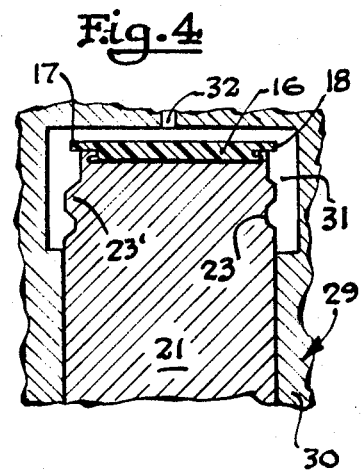
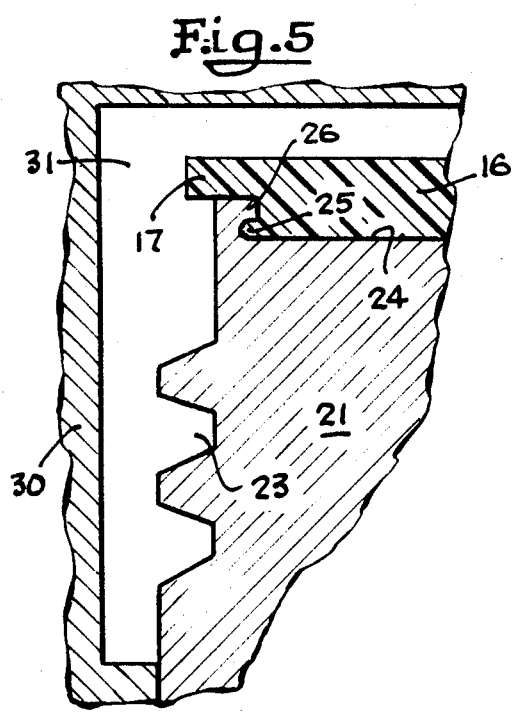
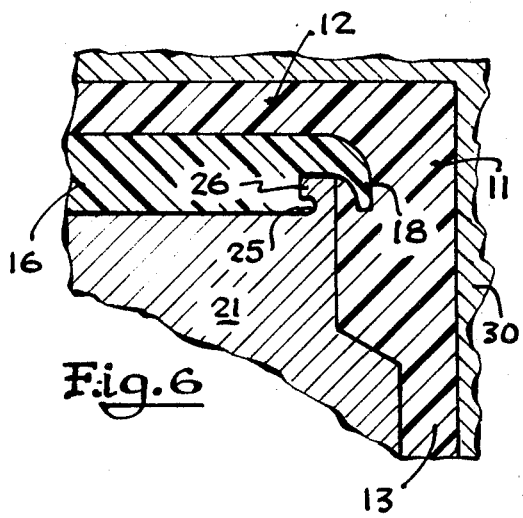
Inventor
George R. Ryan
By Gildo E. Fato
Attorney

3,458,077
COMPOSITE BOTTLE CAP WITH LINER
George R. Ryan, 1431 Henry Place,
Waukegan, Ill. 60085
Filed Apr. 25, 1968, Ser. No. 724,129
Int. Cl. B65d 53/00
U.S. Cl. 215—40                                 4 Claims

ABSTRACT OF THE DISCLOSURE

A composite bottle cap having a body portion and a liner portion formed of plastic materials, the liner fitting within a groove in the inside diameter of the crown portion of the cap and having a peripheral flange extending angularly from the groove to interlock the liner into the crown portion of the cap. The bottle cap is made by injection molding the liner and then injection molding the cap over the molded liner wherein the periphery of the liner is softened and forms an angularly extending flange to thereby effectively interlock the cap and liner.

Background of the invention

A bottle cap or closure, including those with threads in the skirt portion, must have a rigid skirt portion so that the threads will not strip and a relatively compressible crown portion in order to provide an effective seal for the bottle or container. Commonly, bottle caps or closures are made of a thin walled metallic or rigid plastic body portion, which comprises the crown and skirt portions of the cap, and a liner of resilient material secured to the inside surface of the crown of the cap. The liners are usually formed of soft plastic, cork, paperboard or other suitable materials with the bottle contacting surface of the liner often covered with a thin film of metal or plastic. To hold the liner within the cap, the liner may be formed with an outside diameter greater than the inside diameter of the cap and secured in the cap by a press fit. Other methods are to fasten the liner to the cap with an adhesive which sometimes becomes brittle with age and will not hold the liner in place so that upon removal of the cap, the liner adheres to the top of the bottle. Another method is to mold an undercut in the cap so that the liner can be snapped into place. This method oftentimes presents problems because of the difficulty of molding undercuts of sufficient depth in many rigid plastics. With all of these caps and methods, an extra step of inserting the liner in the cap plus two different pieces of equipment to fabricate the completed cap are required.

Summary of the invention

The bottle cap of the present invention comprises a crown and depending skirt made of a first substantially rigid plastic and a liner formed on the underside of the crown of the cap of a second relatively compressible plastic. The cap is made by an injection molding process, whereby a liner with a peripheral flange is first formed in a mold which includes a core. The cavity in the end of the core may include an undercut or notch to aid in holding the liner on the core after it is formed. The mold is then opened and the core with the liner attached thereto is removed. After cooling, the core and liner are placed in a second mold in which the cap is molded around the liner. As the plastic for the body portion of the cap is injected into the mold, the peripheral flange of the liner is softened somewhat so that an angularly projecting flange or lip is formed around the circumference of the liner. Upon cooling, even if no bonding takes place because of the incompatibility of the two plastics, the body portion and the liner of the cap are effectively interlocked together by the angularly projecting lip on the periphery of the liner which extends into the skirt or lower crown portion of the cap. A composite bottle cap is thus formed comprising a substantially rigid body portion and a relatively compressible liner so that upon use, the skirt or crown of the cap will not split and the liner will provide an effective seal.

Drawings

The invention will be better understood by reference to the following description and the accompanying drawings in which:

FIGURE 1 is a cross-sectional view of a composite bottle cap in accordance with an embodiment of the present invention.

FIGURE 2 is a cross-sectional view of part of a mold for forming a liner and comprising a mold block and core assembled to define a liner cavity.

FIGURE 3 is a cross-sectional view of a core and a formed liner attached thereto.

FIGURE 4 is a cross-sectional view of part of a mold for forming the cap body around the formed liner and comprising the core with formed liner attached and a mold block assembled to define a cap body cavity.

FIGURE 5 is a fragmentary cross-sectional view in greater detail of a mold showing a formed liner and cap body cavity.

FIGURE 6 is a fragmentary cross-sectional view in greater detail of a mold showing a formed liner and cap body and the interlocking angularly projecting peripheral lip on the liner.

Detailed description

Referring to the drawings, a bottle cap 10 in accordance with an embodiment of the present invention is illustrated in FIGURE 1 and comprises a body portion 11 having a crown 12 and a depending cylindrical skirt 13 with helical threads 14 formed therein. The body 11 of the cap is formed of a substantially rigid plastic material such as polypropylene or polystyrene so that in use, the cap 10 and particularly the skirt 13 will not crack or split. An annular groove 15 (best illustrated in FIGURE 1) is formed in the skirt 13 at its junction with the crown 12 and into which is formed a portion of the liner 16. The liner 16 is initially formed with an annular peripheral flange 17 which, when the cap body 11 is formed around the liner 16 softens and is distorted to form an angularly projecting lip 18 (FIG. 6) which after the cap body cools, interlocks the cap body 11 and liner 16 together. While the foregoing description has referred to the skirt of the cap as having helical threads formed therein, it is, of course, possible to make the skirt without threads and with a taper, for example, and designed to frictionally fit the neck or finish of a bottle. In another embodiment, the bottom rim of the skirt can have a shoulder formed thereon and designed to interengage a corresponding groove in a bottle or snap over a similar groove therein. Likewise, while the liner 16 has been illustrated as a thin, flat, imperforate circular disk, it can be formed with projecting surfaces, contoured depressions to fit corresponding bottle lips, a depending plug, either solid or hollow to fit the inside of a bottle neck, or in the form of an annular ring.

The bottle cap of the present invention is made by the injection molding process, preferably of the hot runner type so that it will be unnecessary to trim off gates and runners. Usually, post-molding work must be done on injection molded parts to remove the gates, sprue and runners which represent scrap and must be recycled or discarded. By utilizing an insulated runner mold, manifold mold and other hot runner mold types, the sprue and runner can be eliminated. The caps can for instance be molded on machines which transfer a core from one mold to another such as described in Ryan Patent 3,135,-993, with two molding stations.

The process for forming the cap of the present invention is best illustrated in FIGURES 2, 3 and 4. Referring to FIGURE 2, there is shown part of a liner forming mold 19 comprising a mold block 20 and a core 21. Mold mounting plates, or platens, runner design and other conventional mold features are not shown and can be adapted for the particular equipment utilized. The mold block 20 and core pin 21 when assembled together as shown in FIGURE 2 define a thin, flat, circular disk-like liner cavity 22. Since the same core 21 will be used in the two molding steps, it can be designed accordingly. As illustrated, the core 21 has helical shoulders 23 and depressions 23' formed therein which are subsequently employed to mold the threads 14 in the skirt 13 of the cap 10. As shown in greater detail in FIGURE 5, the core 21 has a depression 24 cut therein which defines the bottom of the liner 16. An undercut 25 is formed in the annular ridge 26 in the end of the core 21 which acts to hold the liner 16 on the core 21 after it is formed. The mold body 20 and core 21 together define the liner cavity 22 which includes an annular flange cavity 27. As illustrated, the cavity 22 defines a circular disk-like form which in effect is two circular concentric disks of different diameter, one defined by the opening in the core 21 defined by the depression 24 and the annular ridge 26 and the other defined by the mold block 20 including the annular flange cavity 27, the second cavity being of larger diameter than the first.

After the liner forming mold 19 is closed, plastic such as a low density polyethylene, ethylene vinyl acetate copolymer, ethylene ethyl acrylate copolymer, styrene-butadiene, plasticized polyvinylchloride or other compressible thermoplastic is injected through the gate or opening 28 to form the liner 16. As previously noted, a hot runner technique is preferably used so that it will not be necessary to remove gates and runners from the molded parts. After the liner 16 is formed, the mold 19 is opened and the core 21 with the formed liner 16 attached is removed, and if desired, moved to an intermediate position as illustrated in FIGURE 3 to permit cooling of the liner 16. The core 21 with the formed liner 16 held thereon by the undercut 25 is then placed in a cap forming mold 29 as shown in FIGURE 4. The cap forming mold 29 comprises a mold block 30 and the core 21 with a formed liner 16 attached and which together define a cap body cavity 31, intended to produce the composite bottle cap 10 illustrated in FIGURE 1 and which includes a body portion 11 made up of a crown 12 and depending cylindrical skirt 13 with helical threads 14 therein, the helical shoulders 23 and grooves 23' in the core 21 defining the threads 14 when the core pin is placed in the cap forming mold 29. A second plastic, which can be incompatible with the plastic used to form the liner 16 is then injected through the mold gate 32. Preferably, the second plastic should be one which will produce a substantially rigid cap body 11. Suitable plastics would be polypropylene, polystyrene, rigid polyvinylchloride, high density polyethylene, cellulosic injection molding compolnds such as cellulose propionate, acrylonitrile butadiene styrene, polystyrene and impact resistant modifications thereof, as well as others which are of the more rigid type so that the threads 14 will not strip when the cap 10 is tightened. As the hot plastic is injected through the gate 32 and flows through the cavity 31 around the annular flanges 17 in the liner 16, the flange 17 is softened and is bent downwardly by the hot plastic as it moves into the skirt 13 defining portion of the cavity 31, thereby producing an angularly projecting lip 18 (best illustrated in FIGURE 6) around the periphery of the liner 16 and which serves to interlock the liner 16 and cap body 11 together.

If the plastic employed to form the rigid cap body 11 is injected rapidly, a sharp angularly projecting lip 18, as illustrated in FIGURE 6, will be formed with no deformation of other portions of the liner 16. On the other hand, if the cap plastic is injected slowly, a depression will very likely form in the liner 16 adjacent the gate 32 and the flange 17 will soften and a small portion may flow into the depending skirt 13 of the cap body 11. While this may not impair the effectiveness of the resultant composite bottle cap, the appearance thereof will not be as satisfactory as that produced by the molding conditions previously noted.

Thus the process of the invention permits the production of a composite bottle cap each of the portions of which has the desired advantageous features, i.e. a substantially rigid cap body and a relatively compressible liner.

What is claimed is:

1. A composite plastic bottle cap formed of a first plastic and having a body portion and a liner, the body portion comprising a crown and a depending skirt, the skirt having an annular groove at its junction with the inside diameter of the crown, and a liner formed of a second relatively compressible plastic material disposed within the groove in the depending skirt, said liner having a projecting peripheral lip extending angularly from the liner through the groove into the skirt and interlocking the body portion and the liner.

2. The bottle cap of claim 1 wherein the liner is a thin, flat, imperforate circular disk.

3. The bottle cap of claim 2 wherein the body portion is formed from a plastic selected from the group consisting of polypropylene, polystyrene, rigid polyvinylchloride, high density polyethylene, cellulose propionate and acrylonitrile butadiene styrene and the liner is formed from a plastic selected from the group consisting of low density polyethylene, ethylene vinyl acetate copolymer, ethylene ethylacrylate copolymer, styrene-butadiene and plasticized polyvinylchloride.

4. The bottle cap of claim 3 wherein the depending skirt includes threads positioned internally thereof for threaded engagement with the threaded neck portion of a bottle.

References Cited

UNITED STATES PATENTS 3,189,209  6/1965  Owens _____ 215—40
3,216,600  11/1965  Dreps _____ 215—40

GEORGE T. HALL, Primary Examiner

U.S. Cl. X.R.

215—43